(12) United States Patent
Van Holten et al.

(10) Patent No.: US 6,412,094 B1
(45) Date of Patent: Jun. 25, 2002

(54) METHOD AND CIRCUIT FOR PERFORMING 3/5 MAJOR VOTING

(75) Inventors: Cornelis Arnold Van Holten, Lisboa (PT); Kaija Maria Salonen, Helsinki; Seppo Eerik Salow, Oulu, both of (FI)

(73) Assignee: Nokia Mobile Phones Ltd., Salo (FI)

( * ) Notice: Subject to any disclaimer, the term of this patent is extended or adjusted under 35 U.S.C. 154(b) by 0 days.

(21) Appl. No.: 08/871,442

(22) Filed: Jun. 9, 1997

Related U.S. Application Data

(63) Continuation of application No. 07/823,167, filed on Jan. 21, 1992, now abandoned.

(51) Int. Cl.[7] .............................. H04L 1/08; G06F 11/08
(52) U.S. Cl. ........................................ 714/822; 714/797
(58) Field of Search ............................. 371/67.1, 68.2, 371/69.1, 36, 37.1, 37.9, 52; 395/575; 375/94, 99, 75

(56) References Cited

U.S. PATENT DOCUMENTS

| | | | | |
|---|---|---|---|---|
| 3,760,371 A | * | 9/1973 | Pitroda et al. ................. 371/36 |
| 3,919,690 A | * | 11/1975 | Field et al. ................. 371/69.1 |
| 4,132,975 A | * | 1/1979 | Koike .......................... 371/36 |
| 4,134,103 A | * | 1/1979 | Huxtable et al. .............. 371/52 |
| 4,400,811 A | * | 8/1983 | Brown et al. ................ 371/69.1 |
| 4,404,677 A | * | 9/1983 | Grande et al. .............. 371/69.1 |
| 4,577,332 A | * | 3/1986 | Brenig ........................ 371/69.1 |
| 4,617,475 A | * | 10/1986 | Reinschmitt .................. 371/36 |
| 4,670,880 A | * | 6/1987 | Jitsukawa et al. ......... 371/69.1 |
| 4,937,843 A | * | 6/1990 | Takemoto .................... 375/368 |
| 5,241,548 A | * | 8/1993 | Dillon et al. .............. 371/69.1 |

* cited by examiner

*Primary Examiner*—Christine T. Tu
(74) *Attorney, Agent, or Firm*—Darby & Darby

(57) ABSTRACT

A method for performing 3/5 major voting in the TACS/AMPS mobile phone system, in which a word of the message frame is transmitted repeated five times and every bit of the word is given a value at reception by major voting of the five repeats. The number of ones or zeros of a bit C is counted at least to three. This number is saved as a binary two-bit number B'A' in two memories (2, 3) so that the first (2) contains the least significant bit A' of the number B'A' and the second (3) contains the most significant bit B' of the number B'A'. After the fifth repeat of the bit C, the final number of ones or zeros of the bit C has been counted and saved in the memories (2, 3) and voting is performed on the bit C based on bits A' and B' indicating the number of ones or zeros.

16 Claims, 3 Drawing Sheets

FIG. 3

| A | B | C | B' | A' |
|---|---|---|----|----|
| 0 | 0 | 0 | 0  | 0  |
| 0 | 0 | 1 | 0  | 1  |
| 0 | 1 | 0 | 1  | 0  |
| 0 | 1 | 1 | 1  | 1  |
| 1 | 0 | 0 | 0  | 1  |
| 1 | 0 | 1 | 1  | 0  |
| 1 | 1 | 0 | 1  | 1  |
| 1 | 1 | 1 | 1  | 1  |

FIG. 4

| A | B | C | B' | A' |
|---|---|---|----|----|
| 0 | 0 | 0 | 0  | 1  |
| 0 | 0 | 1 | 0  | 0  |
| 0 | 1 | 0 | 1  | 1  |
| 0 | 1 | 1 | 1  | 0  |
| 1 | 0 | 0 | 1  | 0  |
| 1 | 0 | 1 | 0  | 1  |
| 1 | 1 | 0 | 1  | 1  |
| 1 | 1 | 1 | 1  | 1  |

METHOD AND CIRCUIT FOR PERFORMING 3/5 MAJOR VOTING

This is a continuation of application Ser. No. 07/823,167, filed Jan. 21, 1992, now abandoned.

The invention generally relates to a method and circuit for performing 3/5 major voting in TACS/AMPS mobile phone system in which a word of the data frame is transmitted repeated five times and every bit of the word is given a value at reception by major voting of the five repeats.

BACKGROUND OF THE INVENTION

In the TACS/AMPS mobile phone system every base station sends a continous stream of data on at least one of the twenty-one dedicated forward control channels (FCC). Each frame of the data stream contains bit sync and word sync for mobiles to obtain synchronisation. B/I bits (Busy/Idle bits) are sent at the beginning of every bit sync sequence, word sync sequence, first repeat of the word and every ten message bits thereafter to indicate the state of the reverse channel. The information is sent in forty-bit words and every word is repeated five times to give adequate error protection against fading. As the previous message is sent the following message will be sent also repeated five times preceded by bit sync and word sync. Also the words transmitted on the reverse control channel (RCC) and reverse voice channel (RVC) are repeated five times, whereas the words transmitted on the forward voice channel (FVC) are repeated eleven times. These channels (RCC, RVC, FVC) do not consist of a continously transmitted data stream as does the forward control channel (FCC). At reception major voting is performed on the received bit stream to determine whether the recepted bit has the value one or zero. Major voting is usually performed by saving every repeat in a memory bit by bit, and when the bits from all repeats are saved in a memory, each bit is given the value one or zero according to which value appeared more often, i.e. which value appeared at least three out of five times. The drawback of this method is that it requires a large memory for being able to save all five repeats. Major voting may be performed by logic circuits in which case the bits may be saved in registers or by microprocessors in which the voting algorithm is stored, in which case the bits may be stored in RAM. The memories have to be reset before receiving the following data stream and therefore continous voting has not been realized.

The main objective of the present invention is thus to provide a method and circuit by which 3/5 major voting may be performed with considerably less memory as compared to prior art, and continously which means that a stream of bits may be received without interruption.

SUMMARY OF THE INVENTION

According to the invention major voting is performed by calculating the appeared number of either ones or zeros at every bit of the five repeats and by deciding according to this calculation whether the value of a bit is one or zero. The number of ones or zeros is counted only to three as this number is adequate for performing the voting. Even if the bit has, for an example the value one in all five repeats, it is enough to register three received ones when counting ones, as it is the majority of five and therefore the voting result is the same as if the calculation would be performed to five, i.e. the voting result is one. The situation is equivalent when zeros are counted. The voting according to the method of the present invention may therefore be performed by counting either ones or zeros but not both. In this method a lot of memory is saved because not all the received bits are saved, only the number of received ones or zeros. Because the number of ones/zeros from five repeats is counted to three and the number is expressed as a binary number, it is adequate to have two memory positions, i.e. two bits for the voting of each bit. It is to be noted that although the number of bits of one value (ones or zeros) is counted only to three for every bit position, still every incoming bit is checked. When three bits of the value that is being counted (ones or zeros) have been received the checking of incoming bits is still continued, but this does not affect the calculation any more, because the major value has already been reached. One bit, the least significant bit (LSB) has the weight two to the power of zero, and the other bit, the most significant bit (MSB) has the weight two to the power of one. In prior art five bits have to be saved for the voting of each bit, whereas now two bits are adequate because only the number of received ones or zeros for each bit is saved as a two-bit binary number. The voting method may be performed by a logic circuit so that the voting result is achieved quickly and voting may be performed continously. The invention is characterized by what is stated in the characterizing part of claim 1.

BRIEF DESCRIPTION OF THE DRAWINGS

The invention is further described by referring to the enclosed drawings, where

FIG. 3 shows the truth table of the weight value logic when ones are counted, and FIG. 4 shows the truth table of the weight value logic when zeros are counted.

DESCRIPTION OF THE PREFERRED EMBODIMENT

Figure 1:
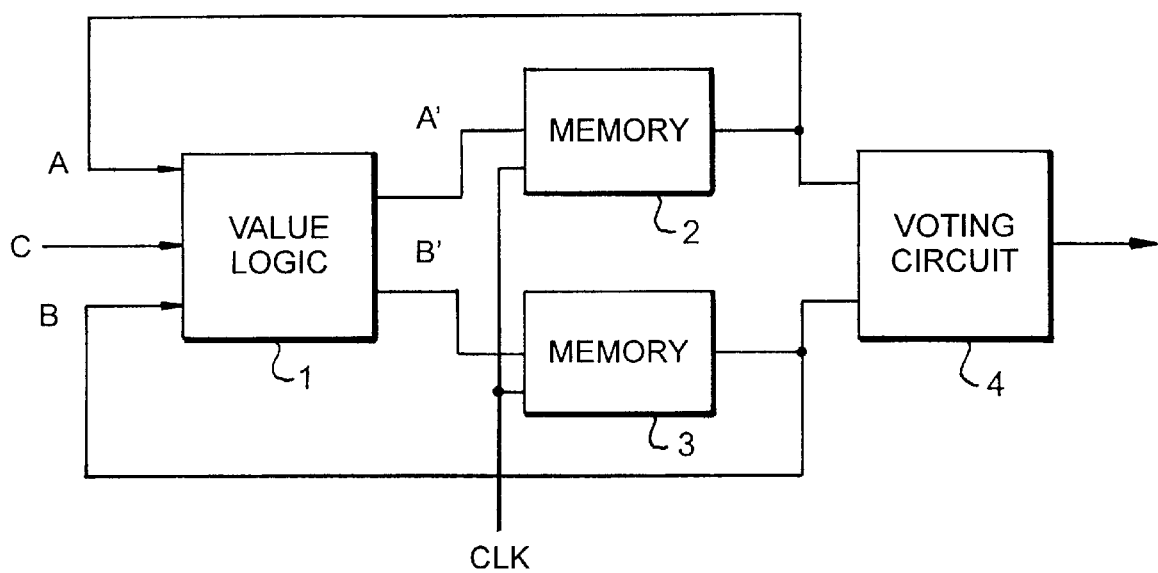
FIG. 1 shows a logic diagram of the circuit, which realizes a 3/5 major voting according to the method.

In FIG. 1 a diagram of the 3/5 major voting logic is shown. In the figure the incoming bitstream C is brought to one input of the weight value logic 1, in which logic a weigth value calculation is performed on each bit according to the following boolean equations or to equivalent equations performing the truth table shown in FIG. 3:

$$A'=AB+A\bar{C}+\bar{A}C$$

$$B'=B+AC$$

where A' stands for the least significant bit i.e. the bit two to the power of zero, and B' stands for the most significant bit, i.e. the bit two to the power of one. Thus the binary number B'A' stands for the number of received ones or zeros and its value is 00 when counting ones and no bit valued one has been received or when counting zeros and no bit valued zero has been received, respectively 01 when one one or one zero has been received. When three or more ones have been received when counting ones or three or more zeros when counting zeros, the value of the number B'A' is 11. Bit A' is saved in memory 2 and bit B' in memory 3, from which memories the bits are brought by feedbacks to the weight value logic 1 as bits A and B to perform the calculation for the following repeat according to the above presented equations. When the weight values have been calculated after the fifth repeat, the number of received ones when counting ones or the number of received zeros when counting zeros is saved in the memories 2 and 3 as bits A' and B'. Then the bits A' and B' are clocked from the memories 2, 3 to the voting circuit 4, preferably an AND gate 4 when counting ones, which performs the 3/5 major voting. The value one given by the AND gate 4 corresponds to the bit value one as a voting result, and the value zero given by the AND gate 4 corresponds to the bit value zero as a voting result. Thus, if at least three ones have been received, both the bits A' and B' coming to the AND gate 4 from the memories 2, 3 are one and therefore the voting result is one. Otherwise the voting result is zero, which can be seen from the following truth table:

| ones | B' | A' | AND gate output |
|------|----|----|-----------------|
| 0 | 0 | 0 | 0 |
| 1 | 0 | 1 | 0 |
| 2 | 1 | 0 | 0 |
| 3 | 1 | 1 | 1 | where A' stands for the bit obtained from memory 2 and B' stands for the bit obtained from memory 3. The memories 2, 3 have to be reset so that the logic circuit of FIG. 1 can calculate the voting result of the following incoming data frame correct. Registers, such as SISO registers (Series-In, Series-Out) or RAMs may be used as memories 2, 3. The amount of storage needed in a memory depends on the number of bits in the word which is to be voted. If the word consists, for an example of ten bits, both memories have to have storage for ten bits, so two ten-bit registers 2, 3 may be used. The number of bits of the transmitted words in the TACS/AMPS system are 40 and 48.

Figure 2:
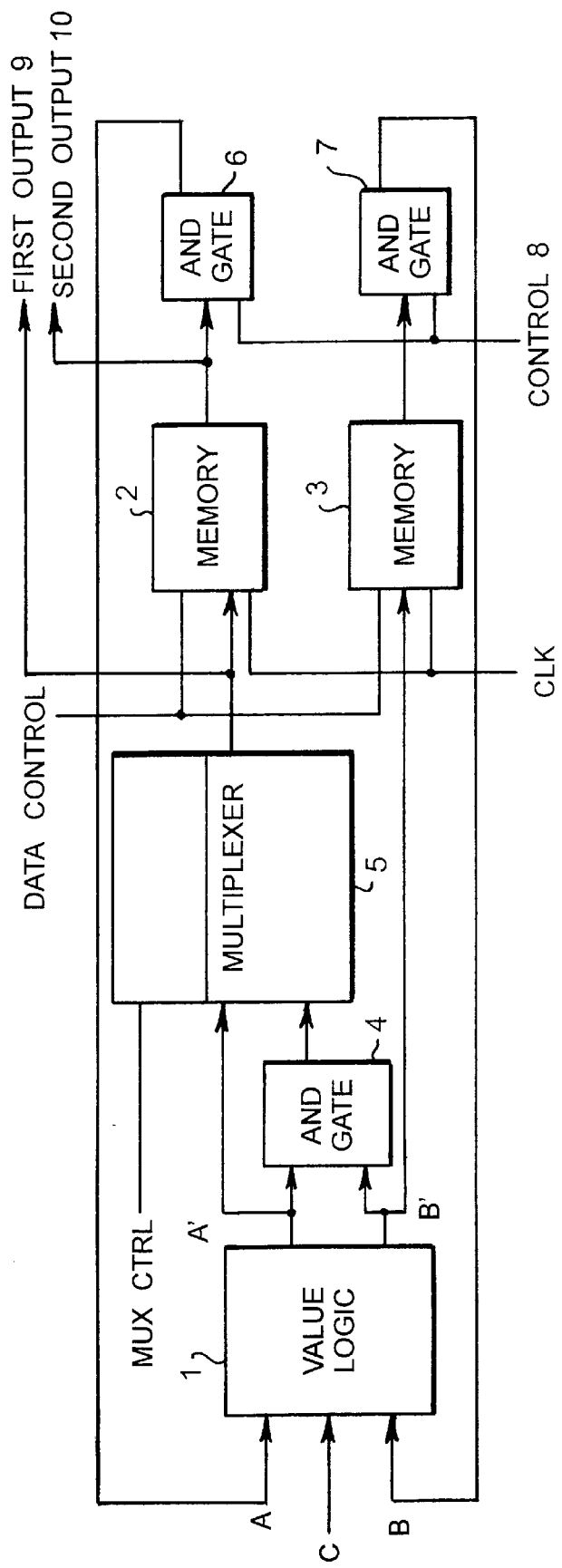
FIG. 2 shows a logic diagram of the circuit, which realizes a continous 3/5 major voting according to the method.

In FIG. 2 a diagram is shown of a logic performing a continous 3/5 major voting. The principle used for performing the voting is the same as in FIG. 1, but the circuit of FIG. 2 has been improved so that it is capable of receiving and voting data frames continously without interruptions or resetting of the memories 2, 3. Also, it outputs the voting result faster, i.e. the voting circuit 4 is situated before the memories 2, 3 and so the voting is performed and the voting result achieved immediately after the fifth repeat before clocking the bits A' and B' to the memories 2, 3. A continous voting is enabled by placing AND gates 6, 7 in the feedback loops so that the feedback loops may be cut off with a separate control 8 and so zeros are obtained in the inputs A and B of the weight value logic 1. In this way the weight value logic 1 starts the counting from the beginning, from zero, and so it looks as if the memories 2, 3 have been reset and therefore new dataframes may be receipted without interruption or resetting of the memories 2, 3. The faster achievement of the voting result by placing the voting gate 4 before the memories 2, 3 also requires a multiplexer 5 coupled as is shown in FIG. 2, where the bit A' and the voting result of the AND gate 4 are brought to its 5 inputs. Thus the bit A' may be directed by the multiplexer 5 to register 2 during the four first repeats and during the fifth repeat the voting result outputted from the AND gate 4 may be directed to the register 2 and to the first output 9. In this way the voting result is outputted fast to the first output 9. During the first repeat of the next frame the voting result is clocked out of the register 2 to the second output 10. Simultaneously, as the voting result is clocked to the second output 10, a cut off of the feedback loop is performed so that the bits A and B coming to the weight value logic 1 are zeros and also the next incoming bit C is obtained at one input of the weight value logic 1. Therefore, bit frames may be received continously without interruptions. The registers 2, 3 may be implemented as series multiplexer-D-flip-flop structures, in which data can be kept stationary with a separate control DATA CONTROL. Thus the data streams to be voted do not have to be continous but the logic can be stopped for a desired time without losing any information. It is important that the continous forward clocking of the data can be stopped, since there usually exist between and among the bit streams other information, such as B/I bits, which may not be considered for voting. This kind of memory structure also makes it possible to use a continous clock and a dynamic series register structure, which may be implemented in a smaller size as a static series register structure.

An optional realization of the invention based on the same principle is to count zeros instead of ones and to perform the 3/5 major voting from the number of zeros. This means that following changes in the circuit realization have to be made:

1) the calculation of the weight value logic 1 has to be changed in such a way that the logic counts zeros instead of ones, in which case the boolean equations performing the calculations have to be following or respective, which realize the truth table shown in FIG. 4:

$$A'=AB+AC+\overline{AC}$$

$$B'=B+A\bar{C}$$

2) the AND gate 4 has to be changed into a NAND gate 4, in order for the voting result to be zero, when the number of received zeros is three or more, and otherwise one. The voting result corresponding to the number of received zeros will therefore be achieved according to the following truth table:

| zeros | B' | A' | NAND gate output |
|-------|----|----|------------------|
| 0 | 0 | 0 | 1 |
| 1 | 0 | 1 | 1 |
| 2 | 1 | 0 | 1 |
| 3 | 1 | 1 | 0 |

A suitable 3/5 major voting for the TACS/AMPS mobile phone system may therefore be realized with a method according to the invention in such a way that the correct bits can be separated from the incoming series bit stream by a separate control. The method saves memory, so realized by logic circuits, less registers are needed as compared to prior art and realized by a program into a microprocessor, smaller RAMs are needed. This memory saving reduces the costs significantly. Also the circuit may be realized in a smaller size and a smaller package may be used than earlier. In a realization according to the invention, one clock is enough for moving data forwards. As this clock, may be used the existing bit synchronised clock, and therefore no divider logic is needed either. The voting is performed in real time, which means that the voting block can receive successive message frames continously without any separate resetting of the memories or separate clocking of the voting result.

What is claimed is:

1. A method for performing 3 out of 5 majority voting in a digital communications system, wherein a data word comprising a plurality of digital bits is transmitted five times to form a plurality of five bit repeats, one for each bit of the data word, and each of the plurality of five bit repeats is assigned a respective bit value based on 3 out of 5 majority voting, the method comprising the steps of:

counting up to a maximum number of three, the number of ones present in each of the plurality of five bit repeats;

storing the number of counted ones separately for each five bit repeat up to a maximum number of three for each five bit repeat in a memory means limited in size to storing a maximum number of three; and performing 3 out of 5 majority voting on the stored number of counted ones for each of the plurality of five bit repeats after all five bits of each five bit repeat have been received by detecting whether each number of counted ones is three or less than three.

2. A method according to claim 1 wherein each of the number of counted ones is a two bit number consisting of a least significant bit and a most significant bit, and the storing step comprises the further steps of:

storing the least significant bit in a first memory; and storing the most significant bit in a second memory.

3. A method according to claim 1 wherein the counting step and the storing step are performed continuously whereby after a one is received, the number of counted ones is incremented and stored in the memory means.

4. A method according to claim 1, wherein the communications system is a TACS/AMPS (Total Access communications System/Advance Mobile Phone Service) mobile phone system.

5. A method for performing 3 out of 5 majority voting in a digital communications system, wherein a data word comprising a plurality of digital bits is transmitted five times to form a plurality of five bit repeats, one for each bit of the data word, and each of the plurality of five bit repeats is assigned a respective bit value based on 3 out of 5 majority voting, the method comprising the steps of:

counting up to a maximum number of three, the number of zeros present in each of the plurality of five bit repeats;

storing the number of counted zeros separately for each five bit repeat up to maximum number of three for each five bit repeat in a memory means limited in size to storing a maximum number of three; and performing 3 out of 5 majority voting on the stored number of counted zeros for each of the plurality of five bit repeats after all five bits of each five bit repeat have been received by detecting whether each number of counted zeros is three or less than three.

6. A method according to claim 5 wherein each of the number of counted zeros is a two bit number consisting of a least significant bit and a most significant bit, and the storing step comprises the further steps of:

storing the least significant bit in a first memory; and storing the most significant bit in a second memory.

7. A method according to claim 5 wherein the counting step and the storing step are performed continuously whereby after a zero is received, the number of counted zeros is incremented and stored in the memory means.

8. A method according to claim 5, wherein the communications system is a TACS/AMPS (Total Access communications System/Advance Mobile Phone Service) mobile phone system.

9. A circuit for performing 3 out of 5 majority voting in a digital communications system, wherein a data word comprising a plurality of digital bits is transmitted five times to form a plurality of five bit repeats, one for each bit of the data word, and each of the plurality of five bit repeats is assigned a respective bit value based on 3 out of 5 majority voting, the circuit comprising:

counting up to a maximum number of three, means for counting the number of ones present in each of the plurality of five bit repeats;

memory means for storing the number of counted ones separately for each five bit repeat up to a maximum number of three for each five bit repeat, said memory means limited in size to storing a maximum number of three; and voting means for performing 3 out of 5 majority voting on the stored number of counted ones for each of the plurality of five bit repeats after all five bits of each five bit repeat have been received by detecting whether each of the number of counted ones is three or less than three.

10. A circuit according to claim 9 wherein each of the number of counted ones is a two bit number consisting of a least significant bit and a most significant bit, and the memory means comprises:

a first memory means for storing the least significant bit; and a second memory means for storing the most significant bit.

11. A circuit according to claim 9 wherein said voting means outputs a one if the number of counted ones for a five bit repeat is three; otherwise, the voting means outputs a zero if the number of counted ones for a five bit repeat is less than three.

12. A circuit according to claim 9, wherein the communications system is a TACS/AMPS (Total Access communications System/Advance Mobile Phone Service) mobile phone system.

13. A circuit for performing 3 out of 5 majority voting in a digital communications system, wherein a data word comprising a plurality of digital bits is transmitted five times to form a plurality of five bit repeats, one for each bit of the data word, and each of the plurality of five bit repeats is assigned a respective bit value based on 3 out of 5 majority voting, the circuit comprising:

counting means for counting up to a maximum number of three, the number of zeros present in each of the plurality of five bit repeats;

memory means for storing the number of counted zeros separately for each five bit repeat up to a maximum number of three for each five bit repeat, said memory means limited in size to storing a maximum number of three; and voting means for performing 3 out of 5 majority voting on the stored number of counted zeros for each of the plurality of five bit repeats after all five bits of each five bit repeat have been received by detecting whether each number of counted zeros is three or less than three.

14. A circuit according to claim 13 wherein each of the number of counted zeros is a two bit number consisting of a least significant bit and a most significant bit, and the memory means comprises:

a first memory means for storing the least significant bit; and a second memory means for storing the most significant bit.

15. A circuit according to claim 13, wherein said voting means outputs a zero if the number of counted zeros for a five bit repeat is three; otherwise, the voting means output a one if the number of counted zeros for a five bit repeat is less than three.

16. A circuit according to claim 13, wherein the communications system is a TACS/AMPS (Total Access communications System/Advance Mobile Phone Service) mobile phone system.

* * * * *

UNITED STATES PATENT AND TRADEMARK OFFICE
CERTIFICATE OF CORRECTION

PATENT NO. : 6,412,094 B1
APPLICATION NO. : 08/871442
DATED : June 25, 2002
INVENTOR(S) : Van Holten et al.

It is certified that error appears in the above-identified patent and that said Letters Patent is hereby corrected as shown below:

On the title page,
Item (*) delete "0" and insert --1259--.

Signed and Sealed this

Fifth Day of December, 2006

JON W. DUDAS
*Director of the United States Patent and Trademark Office*